UNITED STATES PATENT OFFICE.

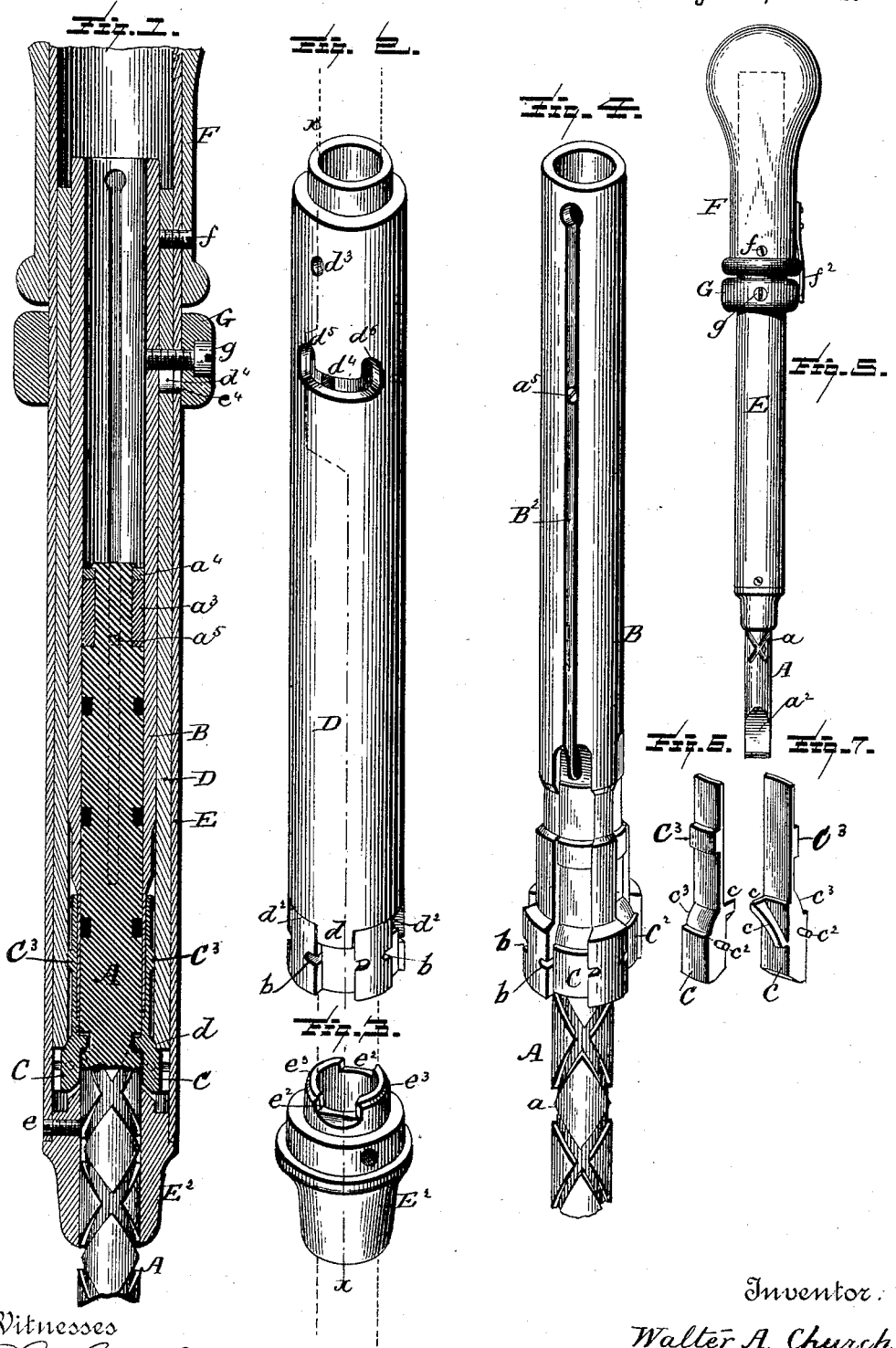

WALTER A. CHURCH, OF BINGHAMTON, ASSIGNOR, BY DIRECT AND MESNE ASSIGNMENTS, TO BENJAMIN F. WATSON AND EDWARD A. EGGERT, BOTH OF BUFFALO, NEW YORK.

SCREW-DRIVER.

SPECIFICATION forming part of Letters Patent No. 452,772, dated May 26, 1891.

Application filed June 16, 1890. Serial No. 355,614. (No model.)

*To all whom it may concern:*

Be it known that I, WALTER A. CHURCH, a citizen of the United States, residing at Binghamton, in the county of Broome, State of New York, have invented certain new and useful Improvements in Screw-Drivers, of which the following is a specification, reference being had therein to the accompanying drawings.

The object of my invention is to produce rotary motion in a screw-driver by means of helical grooves in the spindle in connection with a handle and two pairs of jaws having inclined projections adapted to enter said grooves, one pair being inclined in one direction and the other pair in the opposite direction to rotate the spindle in corresponding directions at the will of the operator to either drive or draw a screw by substantially the same operation. I attain these by the construction illustrated in the accompanying drawings, in which—

Figure 1 is a longitudinal section on line $x$ $x$ of Figs. 2 and 3 through the operative portion of a screw-driver constructed in accordance with my invention. Fig. 2 is a perspective view of the two concentric inner cylinders, the innermost cylinder carrying the operating-jaws. Fig. 3 is a perspective view of the cap of the outer cylinder, showing its crenelled and beveled inner edge to spread the jaws apart. Fig. 4 is a perspective of the innermost cylinder and the jaws thereon with a portion of the grooved spindle between them. Fig. 5 is a side view of the screw-driver on a smaller scale. Fig. 6 is a perspective view showing the outer side of one of the jaws. Fig. 7 is a view of the inner side of the same.

In said drawings, A represents the spindle of the screw-driver. It is provided with helical grooves $a$, running in opposite directions upon its surface. This spindle has its point $a^2$ flattened to be readily received in the slot of a screw-head. Said spindle is loosely fitted within the interior of the innermost tube B, and to retain it connected therewith it carries loosely mounted on its inner end a sleeve $a^3$ and a washer $a^4$, and said sleeve and washer are retained in position by flanging or riveting the upper end of the spindle. A screw $a^5$, radially inserted in the sleeve $a^3$, extends into a groove $B^2$, made lengthwise of the tube B to limit the longitudinal play of the spindle A.

To rotate the spindle A by moving it lengthwise of the tube B, the latter carries in four grooves made lengthwise of the lower portion of its periphery two pairs of jaws C and $C^2$. They are provided with a rib or feather $c$, projecting diagonally across their inner face, said rib being inclined in one direction upon the jaws C and in the opposite direction on the jaws $C^2$, so that when the pair C is in engagement with the spindle and the latter is moved lengthwise it will rotate said spindle in one direction; but when the pair $C^2$ is in engagement it will rotate the spindle in the opposite direction.

To retain the jaws C $C^2$ connected to the tube B, each one has projecting from its sides pins $c^2$, that are received in grooves $b$, formed in the body of said tube alongside of the four grooves that receive the jaws; but there is enough space between the upper portion of the jaws C $C^2$ and the inner surface of the tube D or enough resilience in the upper portion of said jaws to allow them to be opened and closed, as will be hereinafter described.

To keep the ribs or feathers $c$ of either pair of jaws in engagement with the spindle A, a tube D is placed upon the tube B and adapted to slide freely thereon. This tube D has projecting from its lower end and on opposite sides thereof two segments $d$, of substantially the same width as either one of the jaws, and they press upon said jaws when advanced upon the beveled or rounded portion $c^3$ of the jaws, as shown in Figs. 1 and 2. The jaws C $C^2$ are also provided with a transverse rib $C^3$ on their outer surface, which bears against the interior surface of the tube D and is used as a pivot for the jaws.

To permit the engagement of one pair of jaws with the grooves of the spindle A, but also cause the disengagement of the other pair, the cap $E^2$ is used. Said cap is secured by screws $e$ to the lower end of the inclosing tube E of the device, and has its upper edge crenelled, having two rectangular notches $e^2$ in said edge to receive the end of the two engaged jaws without spreading them from engagement with the spindle A, while the longer prtions $e^3$ enter into engagement between said spindle and the second pair of jaws, spreading said jaws apart and rendering them inactive, as the cut-away portions $d^2$ of the lower end of the tube D' do not press upon the back of the jaws.

To the upper end of the tube E the handle F is secured by means of one or more screws $f$, which also extend into screw perforations $d^3$ in the upper end of the tube D, so that practically the tube D, the tube E, its cap $E^2$, and handle F operate as if they were a single piece against the movable innermost tube B and its jaws and also the spindle A. To permit this jaw-carrying tube B to be moved lengthwise to grasp or release the spindle, or to be rotated one-fourth of a revolution to transform the device from a screw-driving to a screw-drawing tool, a ring G is mounted upon the inclosing tube E adjacent to its handle, and is secured to the tube B by means of a screw $g$, that passes through slots $d^4$ $e^4$ of similar form that are coincident in the tubes D E and enter into engagement with a screw-threaded perforation in the side of the tube B.

As the slots $d^4$ $e^4$ are similar, I will only describe the slot $d^4$. It is simply a horizontal passage for the screw $g$ between two slots $d^5$ $d^6$, that are formed lengthwise of the tube to permit the screw $g$ and its operating-ring G to be moved up to cause the jaws C to enter into engagement with the grooves of the spindle or to be moved down to cause said jaws to be opened by coming in contact with the beveled upper edge of the cap $E^2$. A spring $f^2$, secured to the side of the handle F, may be used, if desired, to insure the retention of the ring G in whatever position it may be placed by having the lower end of said spring made to press against or to engage into grooves in the periphery of said ring.

Having now fully described my invention, I claim—

1. In a screw-driver, the combination of a helically-grooved spindle, its inclosing tube B, and two pairs of jaws carried by said tube, with the surrounding tube D, having its lower end adapted to bear upon one pair of jaws, substantially as described.

2. In a screw-driver, the combination of its central spindle having a collar $a^3$ at one end and a screw projecting radially therefrom, the inclosing tube B, having a longitudinal groove for the reception of said screw, jaws carried by said tube, and means, as described, for retaining said jaws in engagement with the spindle, substantially as set forth.

3. The combination of the helically-grooved spindle of a screw-driver, its inclosing tube B, jaws carried by said tube, and projecting screw $g$ to actuate said tube, with the tube D, having the extended segment $d$ and the cap $E^2$, substantially as and for the purpose described.

In testimony whereof I affix my signature in presence of two witnesses.

WALTER A. CHURCH.

Witnesses:
EVERAND A. HAYES,
M. FILLMORE BROWN.